United States Patent [19]

Germerdonk et al.

[11] 4,133,650
[45] Jan. 9, 1979

[54] REMOVING SULFUR DIOXIDE FROM EXHAUST AIR

[75] Inventors: Rolf Germerdonk, Bergisch-Gladbach; Adam Jonas, Leichlingen, both of Germany

[73] Assignee: Bayer Aktiengesellschaft, Leverkusen, Germany

[21] Appl. No.: 795,334

[22] Filed: May 9, 1977

[30] Foreign Application Priority Data

May 28, 1976 [DE] Fed. Rep. of Germany ....... 2623963
Jan. 22, 1977 [DE] Fed. Rep. of Germany ....... 2702583

[51] Int. Cl.² ............................................. B01D 19/00
[52] U.S. Cl. ........................................... 55/49; 55/73; 55/54; 423/243; 423/575
[58] Field of Search .................... 55/73, 68, 47, 48, 49, 55/50, 54, 84; 423/243, 575

[56] References Cited

U.S. PATENT DOCUMENTS

| 2,086,379 | 7/1937 | Clark | 423/243 |
| 2,550,446 | 4/1951 | Blohm et al. | 423/243 |
| 3,798,309 | 3/1974 | Knowles | 423/243 |
| 3,890,431 | 6/1975 | Blitzer | 423/575 |

FOREIGN PATENT DOCUMENTS

| 400998 | 11/1933 | United Kingdom | 423/243 |
| 479630 | 2/1938 | United Kingdom | 423/243 |

*Primary Examiner*—Bernard Nozick
*Attorney, Agent, or Firm*—Sprung, Felfe, Horn, Lynch & Kramer

[57] ABSTRACT

Advantageously the absorption solution is glutaric acid buffered to a pH of about 3.5 to 6.5, the concentration of the glutaric acid is from about 40% up to 90% of the saturation concentration, its temperature is from about 20 to 25° C, it has a concentration of heavy metal ions no more than about $10^{-6}$ mole/l, and to improve the separation of SO₂ from the absorption solution steam is introduced into at least one separator in from about 0.01 to 0.1 kg/l of solution to be desorbed.

2 Claims, 1 Drawing Figure

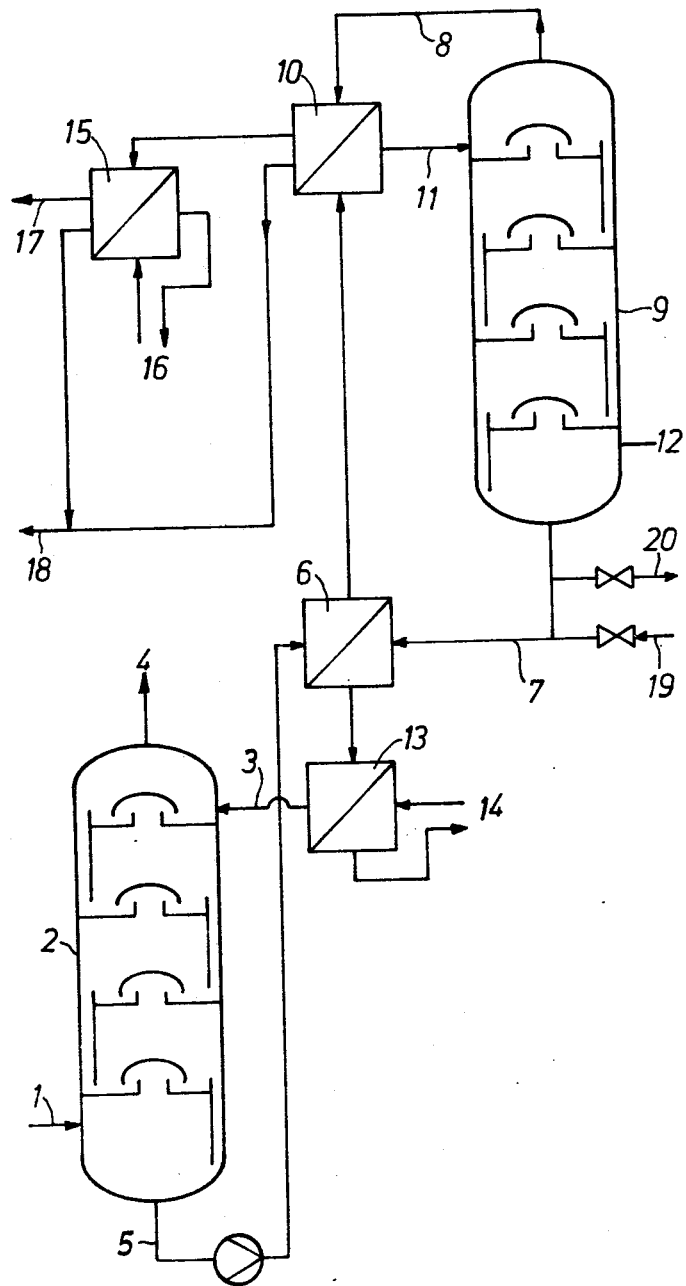

REMOVING SULFUR DIOXIDE FROM EXHAUST AIR

This invention relates to a process for removing sulfur dioxide from exhaust air or exhaust gas and for recovering the sulfur dioxide in concentrated form by removal from an absorbent circuit of aqueous dicarboxylic acid solutions.

Processes for removing sulfur dioxide from exhaust air or exhaust gas streams are already known. In these processes, however, the $SO_2$ accumulates in such low concentrations that it cannot be directly reused or further processed into useful chemicals, the quantities of sulfur-containing substances which accumulate in these processes for treating exhaust air are becoming increasingly larger and it is not always possible to find a suitable use for these substances because, in practice, only pure $SO_2$, $H_2SO_4$ or elemental sulfur can be effectively further processed. Processes in which the sulfur dioxide is reacted to form worthless substances appear problematical as long-term answers on account of the dumping and/or effluent problems to which substances such as these give rise. Accordingly, those processes in which the useful chemicals referred to above are recovered from the waste sulfur dioxide are acquiring increasing significance both for economic reasons and also for anti-pollution reasons. There is particular interest in processes with a low consumption of added chemicals which produce very few waste products and use energy sparingly.

One process which is particularly advantageous in this respect uses aqueous solutions of organic substances (cf. German Pat. Nos. 606,447; 645,879; 660,286; 621,760; 623,018; U.S. Pat. Nos. 2,295,587 and 2,399,013 and British Pat. No. 371,888) in which the $SO_2$ partial pressure over the solution shows a marked dependence upon temperature. With absorption solutions such as these, the sulfur dioxide is washed out of the exhaust gas to be treated, generally in countercurrent, at low temperatures, for example 20° C. The solution laden with sulfur dioxide is then heated, for example to approximately 100° C., as a result of which sulfur dioxide and steam are given off. By cooling the $SO_2$/steam mixture, it is possible to obtain concentrated sulfur dioxide containing less than 5% by volume of steam which may be further processed, for example into sulfuric acid. The solution, which is substantially free from sulfur dioxide after washing out, is cooled and is then recirculated for washing the exhaust air to be treated. The choice of suitable organic substances for this process is limited by the need for (a) a negligibly low natural vapor pressure in order to prevent the exhaust gases to be treated from being additionally burdened with organic substances and to minimize the losses of chemicals;

(b) a high absorption capacity of the washing solution;

(c) a sufficiently low $SO_2$ partial pressure of the regenerated solution after cooling in order to meet the need for a low residual $SO_2$-content in the exhaust has to be treated;

(d) chemical and thermal stability and also negligible formation of undesirable substances during absorption or regeneration; and (e) economy and availability in large quantities.

The aqueous solution proposed, for example, in British Pat. No. 400,998, which is buffered with sodium hydroxide, is attended by the economic disadvantage of using citric acid, in addition to which an appreciable amount of the sulfite meanwhile formed during absorption is oxidized into sulfate. On account of this sulfate formation, which has to be removed from the solution sodium hydroxide has to be continuously introduced to maintain the pH-value required for adequate $SO_2$-absorption.

More recently, interest was shown in a modified citrate process (S. Vasan, Chemical Engineering Program, 71 (1975) 5, pages 61–65), in which the sulfur dioxide is removed from the absorption solution, an aqueous buffered citric acid solution, not by heating, but by subsequently introducing hydrogen sulfide into this solution to convert the sulfur dioxide into elemental sulfur by reaction in accordance with the Claus reaction:

$$2H_2S + SO_2 \rightarrow 3S + 2H_2O$$

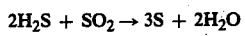

This sulfur is then filtered off from the solution by solid-liquid separation, in which a considerable amount of energy is used, and is subsequently dried. If no hydrogen sulfide is available, it is proposed to produce it by reducing some of the sulfur filtered off, for example with methane. The relatively high oxidation level of 0.5 to 1% of the sulfate output, based on the sulfur dioxide absorbed, is also a disadvantage in this modified citrate process.

Accordingly, the object of the present invention is to find a process which only uses liquids and gases, in which the absorption solution can be thermally regenerated and in which the formation of sulfate is minimal.

Accordingly, the present invention provides a process for removing $SO_2$ from waste air or exhaust gases to concentrations of less than 0.1% by volume by absorption in a buffered, aqueous solution of organic acids, followed by regeneration of the absorption solution by thermal treatment, wherein (a) the gases are scrubbed in one or more scrubbers at temperatures of about 0° to 50° C. with an aqueous dicarboxylic acid solution having a concentration of from about 10 to 95% of the saturation concentration and buffered to a pH-range of from about 2.8 to 9, (b) the dissolved $SO_2$ is subsequently removed from the scrubbing solution at temperatures between about 50° C. and the boiling point of the scrubbing solution, and (c) the scrubbing solution thus regenerated, after cooling to temperatures of from about 0° to 50° C., is recycled for the absorption of more sulfur dioxide.

It has been found that dicarboxylic acids readily soluble in water such as, for example, phthalic acid, maleic acid, malonic acid and glutaric acid, may be used either individually or in admixture as the absorption solution.

Exhaust gases containing $SO_2$ accumulate in a variety of different operations, industrial processes and some combustion processes, for example in Bucher reactions, sulfonation processes and roasting processes, or as smoke gases from the combustion of sulfate-containing fuels.

In general, the $SO_2$-concentrations of the gases accumulating are so low or fluctuating that direct commercial utilization is not possible. For example, relatively small quantities of gases heavily laden with $SO_2$ may also accumulate, or the $SO_2$-concentration of the gases may only be very high on a sporadic basis. However, the concentrations of $SO_2$ which accumulate normally amount to between about 0.1 and at most 20%.

However, not only $SO_2$-containing gases with a low $SO_2$ content can be purified by means of the process of the invention, but also those gases which contain a high proportion of $SO_2$, i.e., more than 20% by volume. $SO_2$-containing gases can be generally worked up to pure $SO_2$ according to the process of the invention.

By means of the process according to the invention the final content of $SO_2$-containing gases, even of fluctuating composition, may be continuously kept between about 0.02 and 0.1% by volume. The scrubbing acid in the scrubber, for example a counter-current column, is buffered to pH-values from the acid to the weakly basic range, normally to a pH-range of from about 2.8 to 9. The pH-range from 3.5 to 6.5 is preferred. Buffering to pH-values above 7 is accompanied by the formation of small quantities of salts which can be removed by withdrawing part of the absorption solution from the circuit. Buffering is carried out with alkalis, for which purpose it is possible to use any alkaline reacting carbonates and hydroxides in dissolved or solid form. For economic reasons, however, sodium and/or potassium hydroxides and carbonates are preferably used.

In addition to $SO_2$, the exhaust gases which normally accumulate also contain $O_2$, $N_2$, $CO_2$, dust and small quantities of hydrogen chloride and organic vapors such as, for example, hydrocarbons. Whereas relatively large quantities of dust and acid constituents, such as hydrogen chloride for example, should be removed from the exhaust gas beforehand, the other constituents do not give rise to any problems. The particular compositions may vary considerably, depending upon the origin of the gases to be treated, and it is only in the case of gases with a high $CO_2$-content that it is advisable to buffer the absorption solution to more acid pH-ranges.

The dicarboxylic acid solution has a concentration of from about 10 to 95% of the saturation concentration at the temperatures applied, preferably about 40 to 90% and, with particular preference, around 75%. The scrubbing solution has temperatures of about 0 to 50° C., preferably about 20 to 25° C. Phthalic acid, maleic acid, malonic acid or glutaric acid are used either individually or in admixture as the dicarboxylic acids. It is preferred to use so-called undistilled glutaric acid which is a mixture of about 40 to 60% of glutaric acid, about 15 to 30% of adipic acid and about 20 to 40% of succinic acid. The dissolved sulfur dioxide is removed from the solution at elevated temperatures i.e., at temperatures above about 50° C. The upper limit to the temperature applied is governed by the composition of the solution, but should not exceed the boiling point of the solution. Temperatures of around 85° to 120° C. are preferably applied.

It is, of course, also possible to remove the dissolved sulfur dioxide from the solution under reduced pressure, in which case the temperatures specified naturally change accordingly. In order to minimize the energy consumption of the process, the solution should as far as possible be preheated in preceding heat exchangers before the sulfur dioxide gas is removed again in a separator. Apparatus known per se may be used both for the separators and also for the scrubbers. It is, of course, also possible in the process according to the invention not only to use one scrubber and one separator, but also to operate several scrubbers and separators both in parallel and also in series. In order to improve the degree of separation, steam or an inert gas is preferably introduced from below into a countercurrent apparatus. To this end, steam for example is used in a quantity of from about 0.01 to 0.4 kg/l of solution to be desorbed, preferably in a quantity of about 0.03 to 0.3 kg/l and, with particular preference, in a quantity of around 0.05 to 0.3 kg/l. After leaving the desorber, the scrubbing solution has a residual sulfur dioxide content of from about 0.02 to 40 g of $SO_2$ per liter, preferably from about 0.1 to 20 kg/liter, and is recirculated in the form of regenerated scrubbing solution to the absorption apparatus for the absorption of more sulfur dioxide. The pH-value may have to be corrected by the addition of alkali, for example as a result of some slight sulfate formation. In this connection, the scrubbing solution may also be freshened up with fresh scrubbing solution.

In the absorption solution small quantities of the sulfite meanwhile formed during absorption are inevitably oxidized into sulfate, even where dicarboxylic acids are used for scrubbing. In order to avoid this oxidation as far as possible, the concentration of heavy metal ions which catalyze oxidation, for example, iron, copper and cobalt, is kept low, preferably around or below $10^6$ mole/l. For this reason, apparatus and pipes are also preferably made of non-metallic materials, for example plastic or glass, while heat-exchange surfaces are preferably made of graphite, titanium or tantalum. In addition, it is possible to add to the solution any known agents, for example gelatine, glue or chelates, which reduce the free concentration of heavy metal ions.

As already mentioned, the concentration of the recirculated absorption solution may amount to between about 10% and 95% of the saturation concentration at the temperature applied.

In one preferred embodiment of the process, this concentration is kept as high as possible, i.e. adjusted to between about 80 and 90%, and constant as a function of time. This embodiment has the advantage that the scrubbing agent can be charged more heavily with $SO_2$ per unit volume, i.e., the volume of the absorption solution is kept relatively low and control of the process is simplified.

In the regenerating section of the absorbent circuit, the steam is partially condensed and hence the absorbent is diluted on account of the inevitable losses of heat. In the preferred embodiment of the process, this quantity of water is removed from the absorption solution by evaporation in the separating section, so that the concentration of acid remains constant as a function of time.

The condensing and evaporating water is kept constant by the co-ordinated choice of the total pressure in the absorption section, the moisture content and temperature of the gas to be treated on entry into the absorption section, the specific quantity of washing solution per cubic meter of exhaust gas, the specific quantity of regenerating steam for any temperatures and the scrubbing solution introduced into the absorption section.

The specific dimensions of the apparatus and the specific quantities of scrubbing solution are dictated by the need for maximum economy of the process with maximum absorption and the $SO_2$ charge of the gases accumulating.

The treated exhaust gas is charged with steam according to its temperature and by selecting the temperature of the absorption solution, it is possible to establish a difference between the steam charge of the gas on entry and exit such that the quantity of water removed by evaporation is equal to the quantity of condensate. The corresponding temperature of the absorption solution may be adjusted for example, by a heat exchanger.

However, as already mentioned above, the process is suitable not only for the purification of $SO_2$-containing gases which contain up to a maximum of 20% by volume of $SO_2$, but also for the purification of gases with a higher proportion of $SO_2$ and/or for the working up of $SO_2$-containing gases of any desired concentration to obtain pure $SO_2$.

The $SO_2$ recovered in pure form by the process according to the invention can then be used for whatever purpose for which it is to be applied, e.g., to serve as a starting gas or as a mixed gas for the production of sulfuric acid, or to be liquefied in pure form. Such dioxide-containing gases with a higher percentage of sulfur result from many diverse chemical processes in industrial and combustion processes.

Thus, for example, according to the present invention, gases resulting from the roasting with burnt sulfur as a source of heat, can be worked up to pure $SO_2$. Higher percentage gases also result from roasting processes using air enriched with oxygen. Also, gases produced in desulfurization plants can be further concentrated or worked up to pure $SO_2$ according to the process of the invention, after an optionally existing $H_2S$ content has been converted into $SO_2$ by means of a suitable combustion process. Other gases with a high $SO_2$ content result for example from the oxygen-enriched roasting of calcinated sulfates, e.g., $FeSO_4$, or from the decomposition of sulfites which are obtained from waste gas washes and can be worked up, if necessary after a gas wash, e.g., with sulfuric acid.

Thus, it can quite generally be said that gases with a high $SO_2$ content, i.e., of over 20% up to far more than 90% can be worked up to pure $SO_2$ according to the process of the invention; also gases with a varying $SO_2$ content can readily be worked up.

The invention will be further described with reference to the accompanying drawing which is a flow sheet of an apparatus for carrying out the process.

In the accompanying drawing, the reference numerals used have the following meanings:
1. entrance of exhaust gas
2. scrubber, countercurrent column
3. absorption solution
4. exit of exhaust gas
5. discharge of absorption solution
6. heat exchanger
7. regenerated absorption solution
8. vapors
9. separator, regeneration column
10. heat exchanger
11. preheated solution
12. fresh steam
13. after-condenser
14. cooling medium
15. residual condenser
16. cooling medium
17. $SO_2$-gas
18. $SO_2$-containing condensate
19. delivery
20. removal (from circuit)

The invention is further illustrated by the following Example carried out with the apparatus of the drawing.

EXAMPLE 1

Exhaust gas (1) containing 5% by volume of sulfur dioxide is scrubbed at 20° C. with a 50% aqueous solution of industrial glutaric acid (3), adjusted to pH 3.8 with sodium hydroxide, in a countercurrent column (2), for example a plate column with 15 plates. With a ratio of 3.5 l of solution per cubic meter of exhaust gas, the sulfur dioxide is removed from the exhaust gas to a residual concentration of 0.02% by volume of $SO_2$ at the exit (4). The scrubbing solution (5) flowing off from the column (2) with 40 g of $SO_2$ per liter of solution is preheated to 85° C. in the heat exchanger (6) in countercurrent to the regenerated scrubbing solution (7) and is then heated approximately to boiling temperature in the heat exchanger (10) with the vapors (8) of the regenerating column (9). The solution (11) thus preheated is regenerated in countercurrent with fresh steam (12) in the column (9) in a ratio of 0.05 kg of fresh steam (12) to 1 liter of solution (11), the sulfur dioxide again being separated to a residual concentration of 0.2 g of $SO_2$ per liter of solution (7). The solution (7) is cooled to 35° C. in the heat exchanger (6) and then to 20° C. with cooling water (14) in the after condenser (13), and enters the circuit (2) in the form of regenerated scrubbing solution (3) in the absorption column.

The sulfur dioxide/steam mixture (8) containing 18.3% by volume of $SO_2$ which flows off overhead from the column (9) is partially condensed in the heat exchanger (10) and then cooled to 30° C. with cooling water (16) in the following residual condenser (15). The sulfur dioxide gas (17) still containing 4.5% by volume of steam enters the further processing stage. The condensate (18) saturated with sulphur dioxide from the heat exchangers (10) and (15) also enters a working-up stage in a quantity of 0.175 kg/m$^3$ of exhaust gas (1).

In the procedure described above, the concentration of glutaric acid in the scrubbing agent circuit remains constant. Since in the new process, too, a small amount of the sulfite in the scrubbing solution is oxidized into sulfate, a component stream (20) has to be removed from the circuit and fresh solution together with sodium hydroxide for keeping the pH-value constant have to be introduced at (19). However, these quantities are smaller by more than one order of magnitude than in the conventional processes using citrate solutions. In order to obtain the low oxidation rate, it is also necessary to keep the concentration of iron and other oxidation catalysts (for example cobalt or copper) in the solution below about $10^{-6}$ mole/l. Accordingly, the columns (2) and (9) and also the pipes are made of non-metallic materials while the heat exchanger surfaces of the apparatus (6), (10) and (13) are made of graphite, titanium or tantalum.

EXAMPLE 2

Exhaust gas (1) containing 27% by volume of sulfur dioxide is scrubbed at 20° C. with a 35% aqueous solution of industrial glutaric acid (3), adjusted to pH 5.8 with sodium hydroxide, in a countercurrent column (2), for example a plate column with 25 plates. With a ratio of 6 l of solution per cubic meter of exhaust gas, the sulfur dioxide is removed from the exhaust gas to a residual concentration of 0.1% by volume of $SO_2$ at the exit (4). The scrubbing solution (5) flowing off from the column (2) with 145g of $SO_2$ per liter of solution is preheated to 85° C. in the heat exchanger (6) in countercurrent to the regenerated scrubbing solution (7) and is then heated approximately to boiling temperature in the heat exchanger (10) with the vapors (8) of the regenerating column (9). The solution (11) thus preheated is regenerated in countercurrent with fresh steam (12) in the column (9) in a ratio of 0.2 kg of fresh steam (12) to 1 liter of solution (11), the sulfur dioxide again being separated to a residual concentration of 20 g of $SO_2$ per liter of solution (7). The solution (7) is cooled to 35° C. in the heat exchanger (6) and then to 20° C. with cooling water (14) in the after condenser (13), and enters the circuit (2) in the form of regenerated scrubbing solution (3) in the absorption column.

The sulfur dioxide/steam mixture (8) containing 15.3% by volume of $SO_2$ which flows off overhead from the column (9) is partially condensed in the heat exchanger (10) and then cooled to 30° C. with cooling water (16) in the following residual condenser (15). The sulfur dioxide gas (17) still containing 4.5% by volume of steam enters the further processing stage. The condensate (18) saturated with sulphur dioxide from the heat exchangers (10) and (15) also enters a working-up stage in a quantity of 1.2 kg/m³ of exhaust gas (1).

In the procedure described above, the concentration of glutaric acid in the scrubbing agent circuit remains constant. Since in the new process, too, a small amount of the sulfite in the scrubbing solution is oxidized into sulfate, a component stream (20) has to be removed from the circuit and fresh solution together with sodium hydroxide for keeping the pH-value constant have to be introduced at (19). However, these quantities are smaller by more than one order of magnitude than in the conventional processes using citrate solutions. In order to obtain the low oxidation rate, it is also necessary to keep the concentration of iron and other oxidation catalysts (for example cobalt or copper) in the solution below about $10^{-6}$ mole/l. Accordingly, the columns (2) and (9) and also the pipes are made of non-metallic materials while the heat exchanger surfaces of the apparatus (6), (10) and (13) are made of graphite, titanium or tantalum.

It will be appreciated that the instant specification and claims are set forth by way of illustration and not limitation, and that various modifications and changes may be made without departing from the spirit and scope of the present invention.

What is claimed is:

1. In the process for removing $SO_2$ from waste air or exhaust gases to a concentration of less than about 0.1% by volume by absorption in a buffered, aqueous solution of an organic acid, followed by regeneration of the absorption solution by thermal treatment, the improvement which comprises
    (a) effecting the absorption by scrubbing in at least one scrubber at a temperature of about 20° to 25° C. with an aqueous solution of undistilled glutaric acid which is a mixture of glutaric, adipic and succinic acids which has a concentration of from about 40 to 90% of the saturation concentration and buffered to a pH of about 3.5–6.5,
    (b) heating the scrubbing solution to a temperature between about 50° C. and the boiling point of the scrubbing solution, thereby to remove the dissolved $SO_2$ and regenerate the solution, and
    (c) cooling the scrubbing solution thus regenerated to a temperature of about 20° to 25° C. prior to recycling for the absorption of more sulfur dioxide.

2. A process as claimed in claim 1, wherein the aqueous solution of glutaric acid has a concentration of heavy metal ions no more than about $10^{-6}$ mole/l, and to improve the separation of $SO_2$ from the absorption solution steam is introduced into at least one separator in from about 0.01 to 0.1 kg/l of solution to be desorbed.

* * * * *

UNITED STATES PATENT AND TRADEMARK OFFICE
CERTIFICATE OF CORRECTION

PATENT NO. : 4,133,650
DATED : January 9, 1979
INVENTOR(S) : Germerdonk et al

It is certified that error appears in the above-identified patent and that said Letters Patent are hereby corrected as shown below:

Abstract, first line of - Before "Advantageously", insert:

-- In the process for removing $SO_2$ from waste air or exhaust gases to a concentration of less than about 0.1% by volume by absorption in a buffered, aqueous solution of an organic acid, followed by regeneration of the absorption solution by thermal treatment, the improvement which comprises a) effecting the absorption by scrubbing in at least one scrubber at a temperature of about 0 to 50°C with an aqueous dicarboxylic acid solution having a concentration of from about 10 to 95% of the saturation concentration and buffered to a pH of about 2.8 to 9, b) heating the scrubbing solution to a temperature between about 50°C and the boiling point of the scrubbing solution, thereby to remove the

UNITED STATES PATENT AND TRADEMARK OFFICE
CERTIFICATE OF CORRECTION

PATENT NO. : 4,133,650
DATED : January 9, 1979
INVENTOR(S) : Germerdonk et al

It is certified that error appears in the above-identified patent and that said Letters Patent are hereby corrected as shown below:

dissolved $SO_2$ and regenerate the solution, and c)     cooling the scrubbing solution thus regenerated to a temperature of about 0 to 50°C prior to recycling for the absorption of more sulfur dioxide. --.

Column 4, line 23, "$10^6$" should read --$10^{-6}$--.

Signed and Sealed this

Nineteenth Day of June 1979

[SEAL]

Attest:

RUTH C. MASON
*Attesting Officer*

DONALD W. BANNER
*Commissioner of Patents and Trademarks*